United States Patent
Omoigui et al.

(10) Patent No.: US 7,096,271 B1
(45) Date of Patent: Aug. 22, 2006

(54) MANAGING TIMELINE MODIFICATION AND SYNCHRONIZATION OF MULTIPLE MEDIA STREAMS IN NETWORKED CLIENT/SERVER SYSTEMS

(75) Inventors: Nosakhare D. Omoigui, Redmond, WA (US); Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/538,624

(22) Filed: Mar. 29, 2000

Related U.S. Application Data

(63) Continuation-in-part of application No. 09/153,664, filed on Sep. 15, 1998, now Pat. No. 6,622,171.

(51) Int. Cl.
G06F 15/16 (2006.01)

(52) U.S. Cl. ............... 709/231; 709/217; 709/219; 709/232

(58) Field of Classification Search ............... 709/217, 709/219, 231–234; 725/41, 43, 90, 94, 96; 715/727, 748, 725, 883
See application file for complete search history.

(56) References Cited

U.S. PATENT DOCUMENTS

| | | | |
|---|---|---|---|
| 4,931,950 A | 6/1990 | Isle et al. | 364/513 |
| 5,050,161 A | 9/1991 | Golestani | 370/60 |
| 5,119,474 A | 6/1992 | Beitel et al. | 395/154 |
| 5,175,769 A | 12/1992 | Hejna | |
| 5,274,758 A | 12/1993 | Beitel et al. | 395/154 |
| 5,309,562 A | 5/1994 | Li | 395/200 |
| 5,313,454 A | 5/1994 | Bustini et al. | 370/13 |
| 5,341,474 A | 8/1994 | Gelman et al. | 395/200 |
| 5,414,455 A | 5/1995 | Hooper et al. | 348/7 |
| 5,420,801 A | 5/1995 | Dockter | |
| 5,434,848 A | 7/1995 | Chimento, Jr. et al. | 370/17 |
| 5,455,910 A | 10/1995 | Johnson et al. | 395/650 |
| 5,481,542 A | 1/1996 | Logston et al. | 370/94.2 |
| 5,490,252 A | 2/1996 | Macera et al. | 395/200.01 |
| 5,504,744 A | 4/1996 | Adams et al. | 370/60.1 |
| 5,519,701 A | 5/1996 | Colmant et al. | 370/60.1 |
| 5,521,630 A | 5/1996 | Chen et al. | 348/7 |
| 5,533,021 A | 7/1996 | Branstad et al. | 370/60.1 |
| 5,537,408 A | 7/1996 | Branstad et al. | 370/79 |
| 5,541,955 A | 7/1996 | Jacobsmeyer | 375/222 |
| 5,559,942 A | 9/1996 | Gough et al. | 395/155 |
| 5,566,175 A | 10/1996 | Davis | 370/84 |
| 5,574,724 A | 11/1996 | Bales et al. | 370/68.1 |
| 5,614,940 A | 3/1997 | Cobbley et al. | 348/7 |
| 5,617,423 A | 4/1997 | Li et al. | 370/426 |
| 5,623,690 A | 4/1997 | Palmer et al. | 395/806 |

(Continued)

OTHER PUBLICATIONS

H.J. Chen, A, Krishnamurthy, T.D.C Little and D. Venkatesh, "A Scalable Video-On Demand Service for the Provision of VCR-Like Functions" May 15, 1995, p. 65-72, xp00632092, Boston University.

(Continued)

*Primary Examiner*—William C. Vaughn, Jr.
*Assistant Examiner*—LaShonda Jacobs
(74) *Attorney, Agent, or Firm*—Perkins Coie LLP

(57) ABSTRACT

In a client/server network system, multimedia content is streamed from one or more servers to the client. The multimedia content includes multiple media streams that can be streamed to the client from the same server or from different servers. The user is able to modify the playback speed of the multimedia content, allowing the playback to be either speeded up or slowed down.

39 Claims, 12 Drawing Sheets

U.S. PATENT DOCUMENTS

| | | | | |
|---|---|---|---|---|
| 5,625,405 | A | 4/1997 | DuLac et al. .................. 348/7 |
| 5,640,320 | A | 6/1997 | Jackson et al. ............. 364/192 |
| 5,642,497 | A | 6/1997 | Crary |
| 5,652,627 | A * | 7/1997 | Allen ......................... 348/497 |
| 5,664,227 | A | 9/1997 | Mauldin et al. ............ 395/778 |
| 5,692,213 | A | 11/1997 | Goldberg et al. ........... 395/806 |
| 5,717,691 | A | 2/1998 | Dighe et al. ................ 370/401 |
| 5,717,869 | A | 2/1998 | Moran et al. ............... 395/339 |
| 5,719,786 | A | 2/1998 | Nelson et al. .............. 364/514 |
| 5,721,829 | A | 2/1998 | Dunn et al. ........... 395/200.49 |
| 5,742,347 | A | 4/1998 | Kandlur et al. ............. 348/426 |
| 5,768,533 | A | 6/1998 | Ran ...................... 395/200.77 |
| 5,786,814 | A | 7/1998 | Moran et al. ............... 345/328 |
| 5,793,980 | A | 8/1998 | Glaser |
| 5,794,210 | A | 8/1998 | Goldhaber et al. ........... 705/14 |
| 5,794,249 | A | 8/1998 | Orsolini et al. ............. 707/104 |
| 5,799,292 | A | 8/1998 | Hekmatpour ................ 706/11 |
| 5,801,685 | A | 9/1998 | Miller et al. ................ 345/302 |
| 5,808,662 | A * | 9/1998 | Kinney et al. ............. 348/14.1 |
| 5,815,689 | A * | 9/1998 | Shaw et al. ................. 703/400 |
| 5,818,510 | A | 10/1998 | Cobbley et al. ................ 348/7 |
| 5,822,537 | A * | 10/1998 | Katseff et al. .............. 709/231 |
| 5,828,848 | A | 10/1998 | MacCormack et al. 395/200.77 |
| 5,835,667 | A | 11/1998 | Wactlar et al. ................ 386/96 |
| 5,838,906 | A | 11/1998 | Doyle et al. ........... 395/200.32 |
| 5,842,172 | A | 11/1998 | Wilson |
| 5,852,705 | A | 12/1998 | Hanko |
| 5,859,641 | A | 1/1999 | Cave .......................... 345/348 |
| 5,864,682 | A * | 1/1999 | Porter et al. ................ 709/247 |
| 5,870,755 | A | 2/1999 | Stevens et al. ............. 707/104 |
| 5,873,735 | A | 2/1999 | Yamada et al. ............. 434/316 |
| 5,892,506 | A | 4/1999 | Hermanson ................ 345/302 |
| 5,893,053 | A * | 4/1999 | Trueblood .................. 702/187 |
| 5,903,673 | A | 5/1999 | Wang et al. ................. 382/236 |
| 5,918,002 | A | 6/1999 | Klemets et al. ........ 395/182.16 |
| 5,930,787 | A | 7/1999 | Minakuchi et al. ............ 707/4 |
| 5,941,936 | A | 8/1999 | Taylor |
| 5,953,506 | A * | 9/1999 | Kalra et al. ................. 709/231 |
| 5,956,716 | A | 9/1999 | Kenner et al. ................ 707/10 |
| 5,995,941 | A | 11/1999 | Maquire et al. .............. 705/10 |
| 5,999,979 | A | 12/1999 | Vellanki et al. ............. 709/232 |
| 6,006,241 | A | 12/1999 | Purnaveja et al. .......... 707/512 |
| 6,014,706 | A | 1/2000 | Cannon et al. ............. 709/231 |
| 6,023,731 | A | 2/2000 | Chawla ...................... 709/231 |
| 6,032,130 | A | 2/2000 | Alloul et al. .................. 705/27 |
| 6,035,341 | A | 3/2000 | Nunally et al. ............. 709/253 |
| 6,041,345 | A | 3/2000 | Levi et al. .................. 709/217 |
| 6,049,823 | A | 4/2000 | Hwang ....................... 709/218 |
| 6,064,794 | A | 5/2000 | McLaren et al. ............. 386/68 |
| 6,118,450 | A | 9/2000 | Proehl et al. ............... 345/349 |
| 6,118,817 | A | 9/2000 | Wang ......................... 375/240 |
| 6,128,653 | A | 10/2000 | Del Val et al. ............. 709/219 |
| 6,133,920 | A | 10/2000 | DeCarmo et al. ........... 345/354 |
| 6,144,375 | A | 11/2000 | Jain et al. .................... 345/302 |
| 6,148,304 | A | 11/2000 | De Vries et al. ............ 707/104 |
| 6,154,771 | A | 11/2000 | Rangan et al. ............. 709/217 |
| 6,166,314 | A | 12/2000 | Weinstock et al. ......... 84/483.1 |
| 6,169,843 | B1 * | 1/2001 | Lenihan et al. ................ 386/46 |
| 6,173,317 | B1 | 1/2001 | Chaddha et al. ............ 709/219 |
| 6,204,840 | B1 | 3/2001 | Petelycky et al. .......... 345/302 |
| 6,215,910 | B1 | 4/2001 | Chaddha ..................... 382/253 |
| 6,230,172 | B1 | 5/2001 | Purnaveja et al. .......... 707/512 |
| 6,233,389 | B1 | 5/2001 | Barton et al. ................. 386/46 |
| 6,332,147 | B1 | 12/2001 | Moran |
| 6,392,651 | B1 | 5/2002 | Stradley |
| 6,424,792 | B1 | 7/2002 | Tsukagoshi |
| 6,453,336 | B1 | 9/2002 | Beyda |
| 6,665,308 | B1 * | 12/2003 | Rakib et al. ................. 370/441 |

OTHER PUBLICATIONS

Microsoft & Real Network, "Advanced Streaming Format (ASF) Specification" Feb. 26, 1998, 1.0 55pgs.

Hardman, L.; Bulterman, D.C.A, "Multimedia Authoring Paradigms", "Authoring and Application of Hypermedia-Based User-Interfaces", IEE Colloquium on p. 8/1-8/3, 1995 INSPEC Accession No. : 5145461, CWI, Amsterdam, Netherlands.

Dionisio, J.D.N; Cardenas, A.F, "A Unified Data Model for Representing Multmedia, Timeline, and Simulation Data," IEEE Transactions on Knowledge & Data Engineering, vol. 10, No. 5, Sep. 10, 1998, pp. 746-767.

* cited by examiner

MANAGING TIMELINE MODIFICATION AND SYNCHRONIZATION OF MULTIPLE MEDIA STREAMS IN NETWORKED CLIENT/SERVER SYSTEMS

RELATED APPLICATIONS

This is a continuation-in-part of U.S. patent application Ser. No. 09/153,664, filed on Sep. 15, 1998, entitled "Multimedia Timeline Modification in Networked Client/Server Systems", published as U.S. Patent Application No. 20020038374 A1 on Mar. 28, 2002, now U.S. Pat. No. 6,622,171.

TECHNICAL FIELD

This invention relates to networked client/server systems and to managing the streaming and rendering of multimedia content in such systems.

BACKGROUND OF THE INVENTION

Multimedia streaming—the continuous delivery of synchronized media data like video, audio, text, and animation—is a critical link in the digital multimedia revolution. Today, streaming media is primarily about video and audio, but a richer, broader digital media era is emerging with a profound and growing impact on the Internet and digital broadcasting.

Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file, text can change and move, and animation and digital effects happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

Although streaming multimedia content compares favorably with more traditional paper-based content in most regards, one disadvantage is that it requires significant time for viewing. It cannot be "skimmed" like paper-based content. Thus, information consumers are forced to choose between the efficiency of the written word and the richness of the multimedia experience.

The invention described below addresses this disadvantage of prior art streaming multimedia content, allowing more efficient multimedia perusal of streaming multimedia presentations than has previously been possible.

SUMMARY OF THE INVENTION

In a client/server network system, multimedia content is streamed from one or more servers to the client. The multimedia content includes multiple media streams that can be streamed to the client from the same server or from different servers. The user is able to modify the playback speed of the multimedia content, allowing the playback to be either speeded up or slowed down. According to one aspect of the invention, the multimedia content includes text streams, image, and/or animation streams.

According to one aspect of the invention, a separate control component is included in the client and/or the server for each individual media stream that manages the presentation of that particular media stream. An additional master control component manages the overall timeline modification for all of the streams in the multimedia content. When a user requests a new playback speed the timeline of the master control component is changed (either speeded up or slowed down) in accordance with the user's request. Each of the separate control components is made aware of this change in the master control timeline, either by the master control sending messages to the separate controls indicating the change, or by the separate controls monitoring the master control timeline. Once aware of the change in the master control timeline, each of the separate control components can adjust their timelines accordingly.

According to another aspect of the invention, the master control detects when the client/server system will potentially be overloaded (e.g., due to a user request for a change in playback speed). This overloading can be due to requiring too much computational power on the part of the client, or on requiring too much bandwidth between the server and the client. If such an overloading condition exists, the master control takes appropriate action to avoid the overloading. Such actions include, for example, changing timescale modification for selected streams from being performed at the client to being performed at the server, reducing the quality of selected streams, pausing selected streams, etc.

DETAILED DESCRIPTION

General Network Structure

Figure 1:
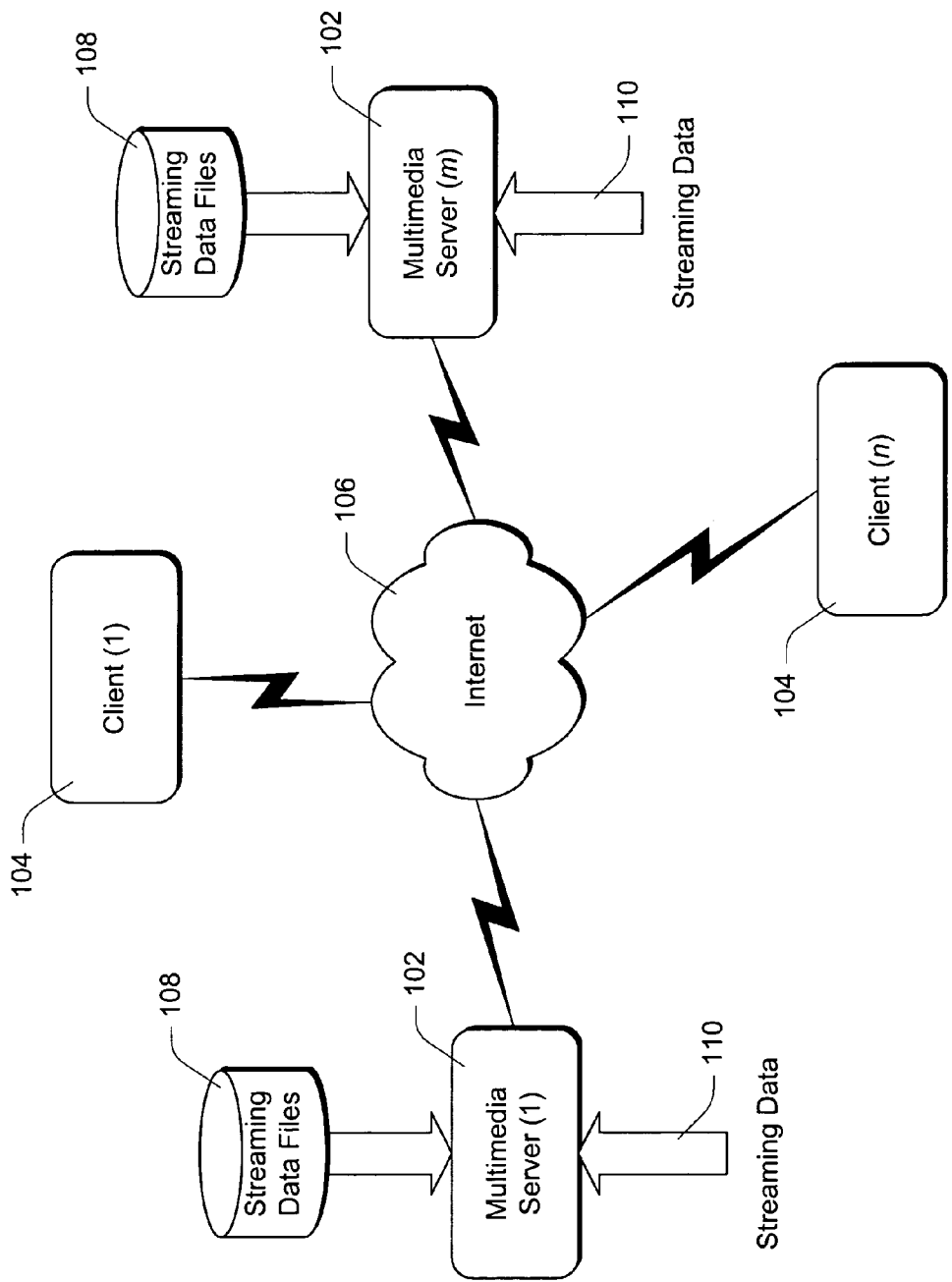
FIG. 1 is a block diagram of a networked client/server system in accordance with the invention.

FIG. 1 shows a client/server network system and environment in accordance with the invention. Generally, the system includes one or more (m) network server computers 102, and one or more (n) network client computers 104. The computers communicate with each other over a data communications network, which in FIG. 1 includes a public network 106 such as the Internet. The data communications network might also include local-area networks and private wide-area networks. Server computers 102 and client computers 104 communicate with one another via any of a wide variety of known protocols, such as the Hypertext Transfer Protocol (HTTP).

Multimedia servers 102 have access to streaming media content in the form of different media streams. These media streams can be individual media streams (e.g., audio, video, graphical, etc.), or alternatively composite media streams including multiple such individual streams. Some media streams might be stored as files 108 in a database or other file storage system, while other media streams 110 might be supplied to the server on a "live" basis from other data source components through dedicated communications channels or through the Internet itself.

The media streams received from servers 102 are rendered at the client computers 104 as a multimedia presentation, which can include media streams from one or more of the servers 102. These different media streams can include one or more of the same or different types of media streams. For example, a multimedia presentation may include two video streams, one audio stream, and one stream of graphical images. A user interface (UI) at the client computer 104 allows users to either increase or decrease the speed at which the multimedia presentation is rendered.

Streaming Media

In this discussion, streaming media refers to one or more individual media streams being transferred over a network to a client computer on an as-needed basis rather than being pre-delivered in their entirety before playback. Each of the individual media streams corresponds to and represents a different media type and each of the media streams can be rendered by a network client to produce a user-perceivable presentation using a particular presentation medium. The individual media streams can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. The individual media streams have their own timelines, which are synchronized with each other so that the media streams can be rendered simultaneously for a coordinated multimedia presentation. These individual media streams can be delivered to the client computer as individual streams from one or more servers, as a composite media stream(s) from one or more servers, or a combination thereof.

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, such as synchronized audio or sound, video graphics or motion pictures, animation, textual content, command script sequences, etc. A composite media stream includes a plurality of individual media streams representing the multimedia content.

There are various standards for streaming media content and composite media streams. The "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Regardless of the streaming format used, an individual data stream contains a sequence of digital data units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

For a composite media stream, the individual data streams are typically interleaved in a single sequence of data packets. Various types of data compression might be used within a particular data format to reduce communications bandwidth requirements.

The sequential data units (such as audio sample values or video frames) of the individual streams are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes the presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, the invention could be implemented in hardware or a combination of hardware, software, and/or firmware. For example, one or more application specific integrated circuits (ASICs) could be programmed to carry out the invention.

Figure 2:
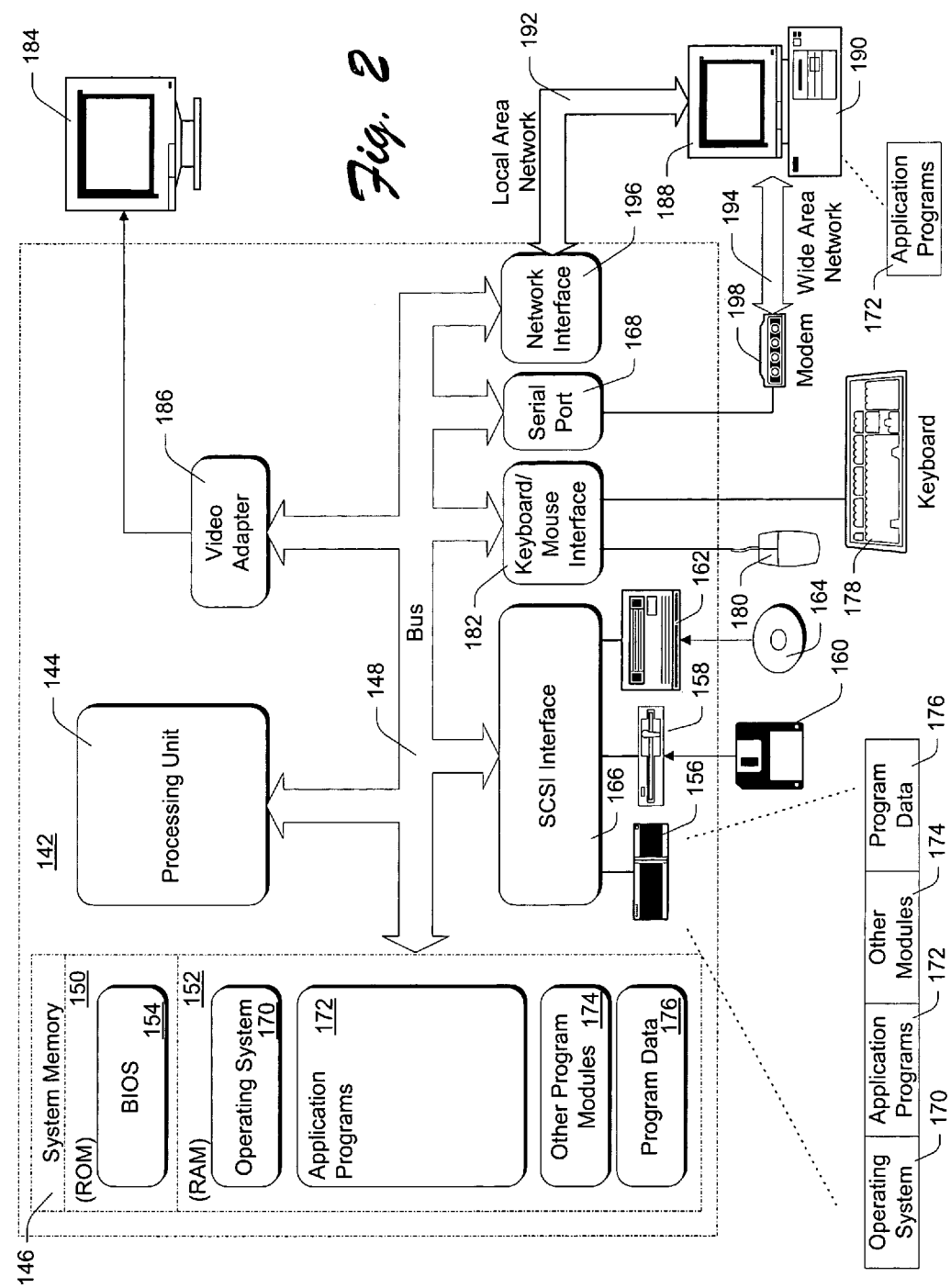
FIG. 2 is a block diagram of a networked computer that can be used to implement either a server or a client in accordance with the invention.

FIG. 2 shows a general example of a computer 142 that can be used in accordance with the invention. Computer 142 is shown as an example of a computer that can perform the functions of any of client computers 102 or server computers 104 of FIG. 1.

Computer 142 includes one or more processors or processing units 144, a system memory 146, and a system bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, a magnetic disk drive 158 for reading from and writing to a removable magnetic disk 160, and an optical disk drive 162 for reading from or writing to a removable optical disk 164 such as a CD ROM or other optical media. The hard disk drive 156, magnetic disk drive 158, and optical disk drive 162 are connected to the system bus 148 by an SCSI interface 166 or some other appropriate interface. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 182 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Client-Based Multimedia Time-Scale Modification

As shown in FIG. 1, a network system in accordance with the invention includes a network server(s) 102 from which a plurality of media streams are available. In some cases, the media streams are actually stored by server(s) 102. In other cases, server(s) 102 obtain the media streams from other network sources or devices.

The system also includes network clients 104. Generally, the network clients 104 are responsive to user input to request media streams corresponding to selected multimedia content. In response to a request for a media stream corresponding to multimedia content, server(s) 102 streams the requested media streams to the network client 104 in accordance with some known format such as ASF. The client renders the data streams to produce the multimedia content.

A network client 104 also accepts a speed designation from a human user. The speed designation is a speed factor relative to the original or default playback speed of the selected multimedia content. For example, a speed factor of 1.2 indicates that the multimedia content is to be rendered at 1.2 times its original or default speed, thereby achieving time compression. A speed factor of 0.8 indicates that the multimedia content is to be rendered at 0.8 times its original or default speed, thereby achieving time expansion.

In response to the speed designation from the user, the system modifies the timelines of the individual media streams of the multimedia content, while keeping the timelines synchronized with each other and while maintaining the original pitch of any audio produced from audio streams. In one embodiment of the invention, such timeline modification is performed by the network client. In other embodiments of the invention, the timeline modification can be performed at the network server before the media streams are streamed to the network client.

Timeline modification changes the timeline of the received data streams in accordance with the user speed designation to achieve either time compression or time expansion (also referred to as "time-scale modification"). With some types of media, such as video, text, and image streams, this involves omitting selected frames or modifying the presentation times of the individual data units or video frames. In other cases, such as with audio streams, the time-modification is more difficult—simply changing the presentation times would alter the pitch of the original audio and make it unintelligible. Accordingly, some type of audio processing technique is used to time-compress or time-expand audio streams, while maintaining the original pitch of the audio—thereby maintaining the intelligibility of the audio.

There are various known methods of audio time modification, commonly referred to as "time-scale-modification," most of which concentrate on removing redundant information from the speech signal. In a method referred to as sampling, short segments are dropped from the speech signal at regular intervals. Cross fading or smoothing between adjacent segments improves the resulting sound quality.

Another method, referred to as synchronized overlap add method (SOLA or OLA), consists of shifting the beginning of a new speech segment over the end of the preceding segment to find the point of highest cross-correlation (i.e., maximum similarity). The overlapping frames are averaged, or smoothed together, as in the sampling method.

Sampling with dichotic presentation is a variant of the sampling method that takes advantage of the auditory system's ability to integrate information from both ears. In improves on the sampling method by playing the standard sampled signal to one ear and the "discarded" material to the other ear. Intelligibility and compression increase under this dichotic presentation condition when compared with standard presentation techniques.

The methods mentioned above are considered "linear" because all portions of the speech signal are compressed or expanded uniformly. Other methods are considered non-linear because they non-uniformly remove portions of the time signal. One example of a non-linear time-compression method is referred to as pause removal. When using this method, a speed processing algorithm attempts to identify and remove any pauses in a recording. Either linear or non-linear time-scale modification can be used with the invention.

More information regarding audio time modification is given in an article that appeared in the March, 1997, issue of "ACM Transactions on Computer-Human Interaction" (Volume 4, Number 1, pages 3–38) (1997). For purposes of this disclosure, it can be assumed that audio time modification involves some combination of changing individual data stream samples, dropping certain samples, and adjusting presentation times of any samples that are actually rendered.

Similarly, text streams can also be time-scale modified either linearly or non-linearly. Linear time-scale modification can be accomplished by speeding up or slowing down the rate at which the text data is streamed to the client and/or rendered by the client. Non-linear time-scale modification can be accomplished by using an algorithm to summarize the text data by selecting key words, phrases, sentences or paragraphs. There are various known methods for selecting such words or portions of textual content, such as the term frequency/inverse document frequency technique.

Time-scale modification of image streams can also be performed linearly or non-linearly. Linear time-scale modification can be accomplished by speeding up or slowing down the rate at which the image data is streamed to the client and/or rendered by the client. Non-linear time-scale modification can be accomplished by using an algorithm to analyze the images and rank their importance relative to one another. Less important images can then be removed to time-compress the image stream. There are various known methods of determining the importance of images, such as the compressed domain shot boundary detection, pixel-based shot boundary detection, histogram-based shot boundary detection, and feature-based shot boundary detection algorithms.

Non-linear time-scale modification of image streams can also be accomplished by using progressive rendering. In progressive rendering, each image is made up of multiple layers that are streamed to the client. These layers are rendered at the client with subsequent layers being overlaid on top of previous layers, each subsequent layer providing further detail to the previous layers. The image stream can thus be time modified by removing (or adding) layers to the images.

Animation streams are similar to image streams, except that the images of an animation stream are tied to a timeline. Animation streams can be linearly or non-linearly time-scale modified. Linear time-scale modification can be accomplished by speeding up or slowing down the timeline the images in the animation stream are tied to, thereby reducing or increasing the duration that each image in the animation stream is rendered. Non-linear time-scale modification can also be accomplished using any of the techniques discussed above with reference to image streams.

Figure 3:
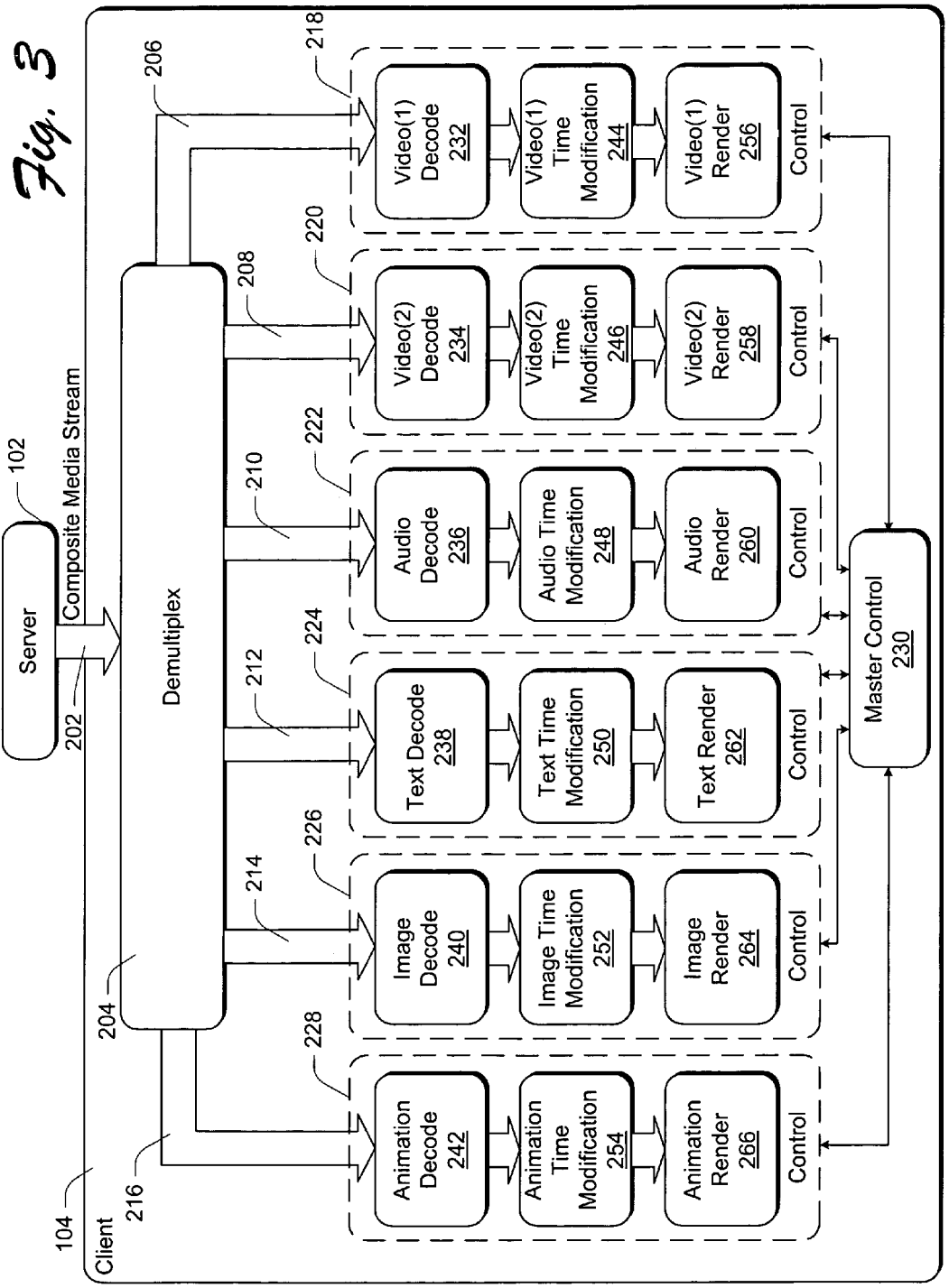
FIG. 3 is a block diagram illustrating communications and rendering of a composite media stream in accordance with the invention.

FIG. 3 illustrates an embodiment of the invention in which timeline modification is performed by network client 104. Network server 102 streams a composite media stream 202 to network client 104 (although not shown in FIG. 3, other communications also take place bi-directionally between server 102 and client 104, such as control-oriented communications). The composite media stream 202 has a plurality of individual media streams as described above. For purposes of discussion, it is assumed in this example that the composite media stream has an audio stream, two video streams, a text stream, an image stream, and an animation stream. In the illustrated example, the media streams are received from a single server as a composite media stream. Alternatively, the media streams may be received as individual (or composite) streams from multiple servers.

Each media stream has a timeline, and the timelines of the individual streams are synchronized with each other so that the streams can be rendered in combination to produce coordinated multimedia content at the network client 104. The original timelines correspond to the original recording or rendition of the multimedia material, so that rendering the streams according to their timelines results in presentation speeds that closely match the speed of the original event or performance. In the case of audio streams, the timelines preserve the original speed and pitch of the original audio content.

The client computer has a demultiplexer component 204 that receives the composite media stream and that separates out the individual media streams from the composite format in which the data is streamed (such as ASF). This results in video streams 206 and 208, an audio stream 210, a text stream 212, an image stream 214, and an animation stream 216. Client 104 includes a different "control" 218, 220, 222, 224, 226, and 228 for each of the media streams 206, 208, 210, 212, 214, and 216, respectively. Each of these controls is a set of instructions, executed by a processor of client 104, that manages the presentation of its corresponding media stream. Client 104 also includes a master control 230 that coordinates the overall presentation of the media content, as discussed in more detail below.

The individual media streams are sent to and received by respective decoders 232, 234, 236, 238, 240, and 242 that perform in accordance with the particular data format being employed. For example, the decoders might perform data decompression.

The decoded data streams are then sent to and received by respective time modification components: video timeline modification components 244 and 246, an audio timeline modification component 248, a text timeline modification component 250, an image timeline modification component 252, and an animation timeline modification component 254. These components receive input from a human operator in the form of a speed designation as described above. The timeline modification components change the timelines of the received media streams in accordance with the user speed designation to achieve either linear time compression or linear time expansion. With some types of media (e.g., with video streams, text streams, image streams, or animation streams) this involves either omitting selected portions of the streams or modifying the presentation times of the individual data units or frames of the stream. In other cases (e.g., with audio streams), some type of audio processing technique as the SOLA technique described above is used to time-compress or time-expand audio streams, while maintaining the original pitch of the audio and to also retain the intelligibility of the audio.

The timeline modification components 244–254 produce individual media streams that are provided to and received by respective renderers 256, 258, 260, 262, 264, and 266.

The rendering components 256–266 render the streams in accordance with their modified timelines, as the streams continue to be streamed from the network server. In alternative embodiments of the invention, timeline modification components 244–254 might be eliminated and their functions performed by decoders 232–242.

Note that the speed designation, provided by the user, dictates the rate at which the network client consumes the composite data stream. Because of this, the client communicates the speed designation to the network server when requesting a particular media stream. The server responds by streaming the media stream at a rate that depends on or is proportional to the speed designation provided by the user. For example, for a speed factor of 2.0, the client consumes data at twice the normal rate. Accordingly, the server streams the media stream at twice its normal rate to meet the demands of the client.

In the described embodiment, the user is allowed to change the speed designation during rendering of the multimedia content. In some cases, however, it may not be possible to change the playback speed without interrupting the playback momentarily. If this is the case, playback resumes as soon as possible, beginning at a point that shortly precedes the point at which playback was discontinued. Thus, there is some overlap in the presentation—when the presentation resumes, the overlap provides context for the new content that follows.

Figure 4:
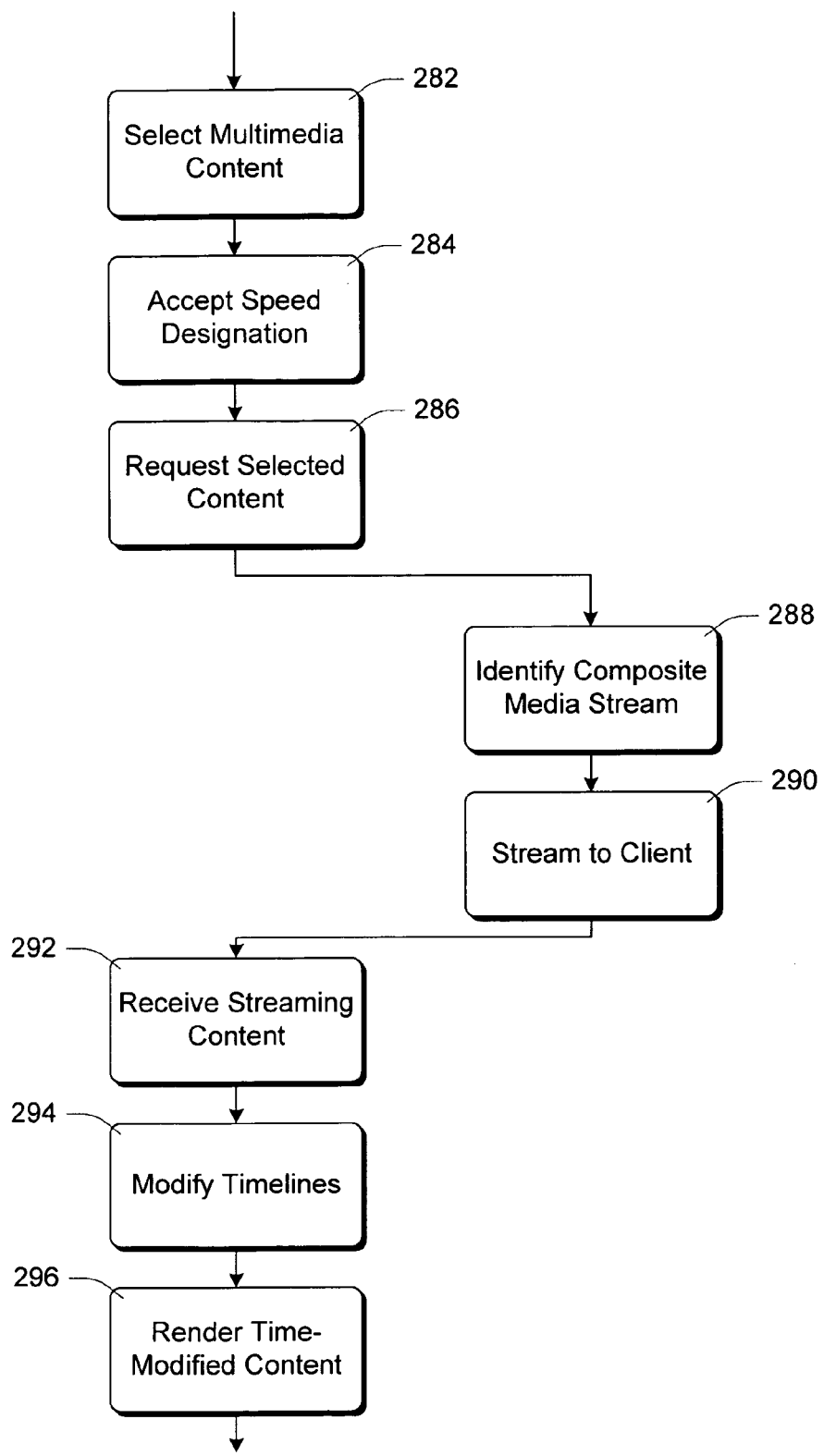
FIG. 4 is a flowchart illustrating an exemplary process for client-based multimedia time-scale modification.

FIG. 4 illustrates an exemplary process for client-based multimedia time-scale modification. Steps performed at network client 104 are shown on the left-hand side of the figure, while steps performed by network server 102 are shown on the right-hand side of the drawing. The process of FIG. 4 may be performed in software, and is described with additional reference to components in FIG. 3.

Multimedia content from network server 102 is selected for rendering at network client 102 (step 282). In most cases, a user performs this selection from a menu of available content or via an URL (uniform resource locator) selection. In some cases, different media streams might be available for a particular content segment, varying perhaps in quality and in required bandwidth. Preferably, however, the user is unaware of anything except the simple act of selecting a single topic or composite stream.

A speed designation for the multimedia content is accepted from a human user (step 284). This step is independent of the previous step of selecting the content itself. Furthermore, the user can vary the speed designation at any time during presentation of the selected content, without having to re-select the content.

The selected content is requested from the server at a speed that will satisfy the requirements of the user's speed designation (step 286). Based on this request, the server identifies the particular composite media stream corresponding to the selected content (step 288). The server streams this composite media stream to the client (step 290). In this embodiment, the composite media stream has its original timeline, which does not necessarily result in the speed that the user has designated for playback.

The client receives the streaming content (step 292) and modifies the timeline of the media stream(s) in accordance with the speed designation provided by the user (step 294). As described above, this involves modifying the timelines of the individual media streams while maintaining their synchronization and intelligibility. The composite media stream is then rendered in accordance with its modified timeline (step 296).

Server-Based Multimedia Time-Scale Modification

In various embodiments of the invention, modifying the timeline of the requested multimedia content can be performed dynamically (or "on the fly") in the client as described above, in the server, or in both the client and server. In embodiments where the timeline modification for a stream is carried out at the server the time modification component 244–254 of FIG. 3 for that stream need not be included in client 104. Rather, components 244–254 would be included in the corresponding server that is providing the stream. Additionally, modifying the timeline of different streams for requested multimedia content can be performed in different locations for different streams. For example, audio and video timeline modification may be performed at the server, while image, animation, and text timeline modification may be performed at the client. However, in the network environment, it is often desirable to avoid performing any significant timeline modification in the server. Otherwise, the server could quickly become overloaded with requests from multiple clients.

Alternatively, in some cases it may be desirable to store multiple versions of media streams at a server and to select particular versions of the media streams depending on the timeline requirements of the client, as designated by the user. One advantage of this method is that it can require comparatively less communications bandwidth between the server and client.

As a general example, a server might store a plurality of media streams having timelines modified by different factors. When a client requests a composite media stream, the server selects the version of the media stream whose timeline most closely accords with the speed designation set by the user. If the timeline does not exactly match the speed designation, the client can perform further timeline modification.

Figure 5:
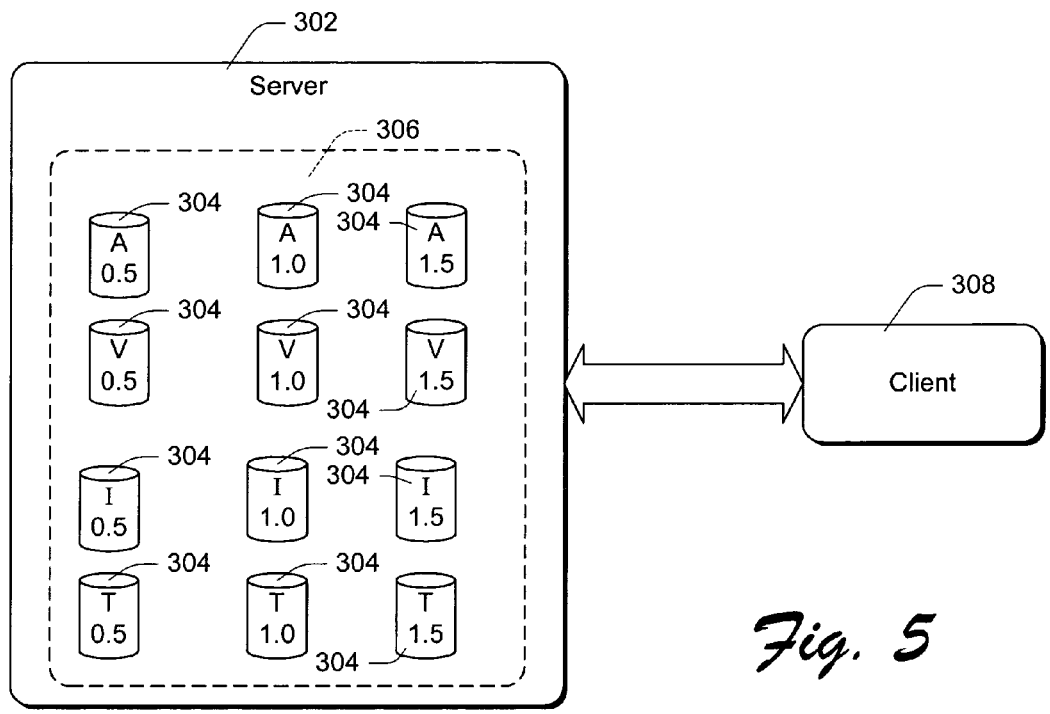
FIG. 5 is a block diagram illustrating one embodiment in which a plurality of timeline-altered media streams are stored at and provided from a server.

FIG. 5 illustrates a more specific example. In this embodiment, a server 302 stores multiple media streams 304 corresponding to specific multimedia content 306. The media streams are of different types, such as audio, video, image, and text. In FIG. 5, audio streams are designated by the letter "A", video streams are designated by the letter "V", image streams are designated by the letter "I", and text streams are designated by the letter "T". Any combination of a single audio stream, a single video stream, a single image stream, and a single text stream can be rendered to produce the multimedia content.

The various individual data streams have timelines that are modified by different degrees. The speed factors are indicated in FIG. 5. In this embodiment, the audio, video, text, and image streams are organized as sets, each set forming a composite media stream having a timeline that has been modified by a factor of 0.5, 1.0, or 1.5.

When a client 308 requests multimedia content from server 302, the client 308 identifies both the content and the speed factor. In response, the server selects the audio, video, image, and text streams that have timelines most closely approximating the identified speed factor, and combines those individual media streams to form the composite media stream. The resulting composite media stream is then sent to the client. When the timeline is accelerated, this saves bandwidth in comparison to sending an unaltered composite media stream having a higher streaming rate to meet the accelerated consumption demands of the client.

As a further optimization, the server can store composite media streams having different degrees of timeline modification and different degrees of quality. Generally, a media stream of a lower quality will consume less communications bandwidth than a media stream of a higher quality. Before selecting an appropriate media stream, the server determines the available bandwidth between the server and the client. It then selects a combination of individual media streams that provides the best quality while requiring no more than the available bandwidth.

Figure 6:
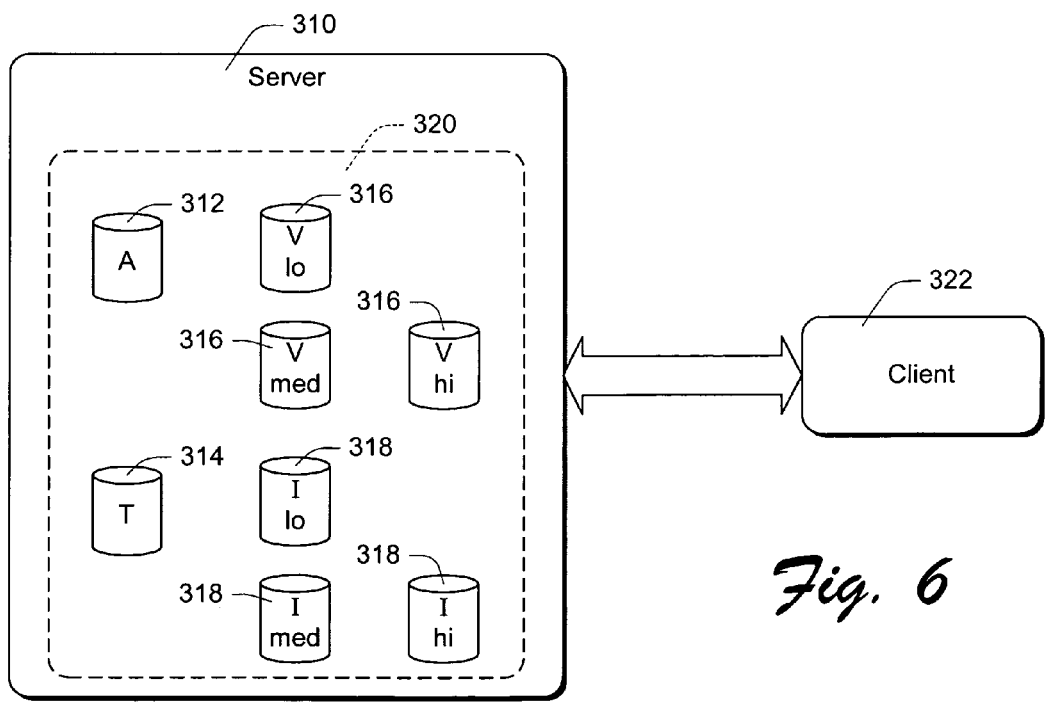
FIG. 6 is a block diagram illustrating another embodiment in which a plurality of timeline-altered media streams are stored at and provided from a server.

FIG. 6 illustrates a further example utilizing this concept. In this case, a server 310 has stored a single audio stream 312, a single text stream 314, multiple video streams 316, and multiple image streams 318, all corresponding to a single multimedia segment 320. The video streams and image streams differ in quality and corresponding required bandwidth: low (lo), intermediate (med), and high (hi). However, the video streams and the image streams all have a common, unmodified timeline.

When a client 322 requests the multimedia content from server 310, the server determines or notes both the speed factor designated by the user and the available bandwidth. It then selects the video stream that has best available quality while also requiring no more bandwidth (at the requested speed factor) than the difference between the available bandwidth and the bandwidth consumed by the selected audio stream. Again, this allows the system to compensate for various available bandwidths.

Figure 7:
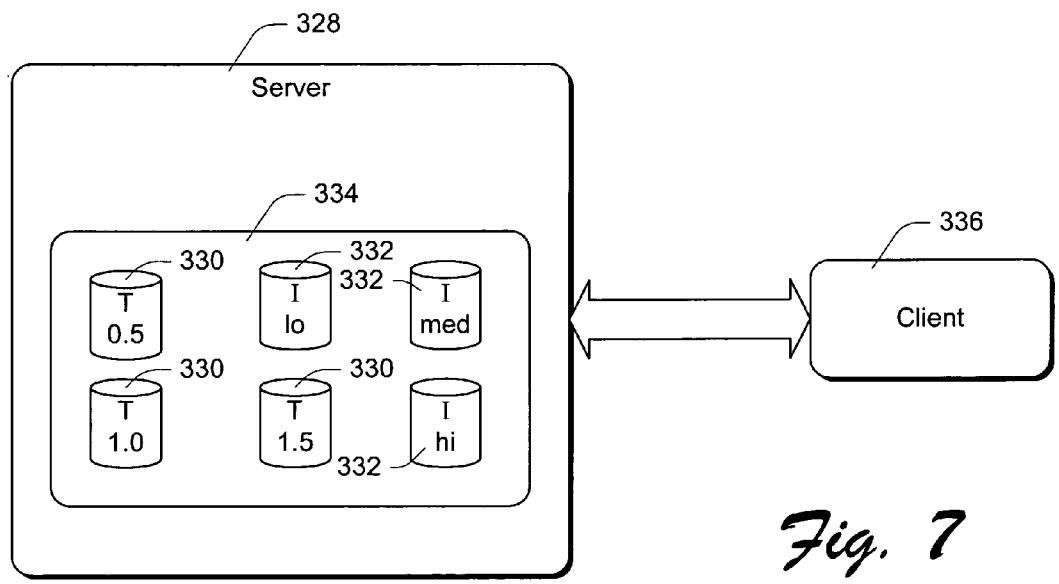
FIG. 7 is a block diagram illustrating yet another embodiment in which a plurality of timeline-altered media streams are stored at and provided from a server.

FIG. 7 shows another example, in which a server 328 has stored multiple text streams 330 and multiple image streams 332, all corresponding to a single multimedia segment 334. The text streams differ in the degree by which their timelines have been modified. In this example, there are text streams having timelines modified by factors of 0.5, 1.0, and 1.5. The image streams differ in quality and corresponding required bandwidth: low (lo), intermediate (med), and high (hi). However, the image streams all have a common, unmodified timeline.

When a client 336 requests the multimedia content from server 328, the server determines or notes both the speed factor designated by the user and the available bandwidth. It then selects a text stream that most closely accords with the specified speed factor. It then selects the image stream that has best available quality while also requiring no more bandwidth than the difference between the available bandwidth and the bandwidth consumed by the selected text stream. Again, this allows the system to compensate for various available bandwidths.

Figure 8:
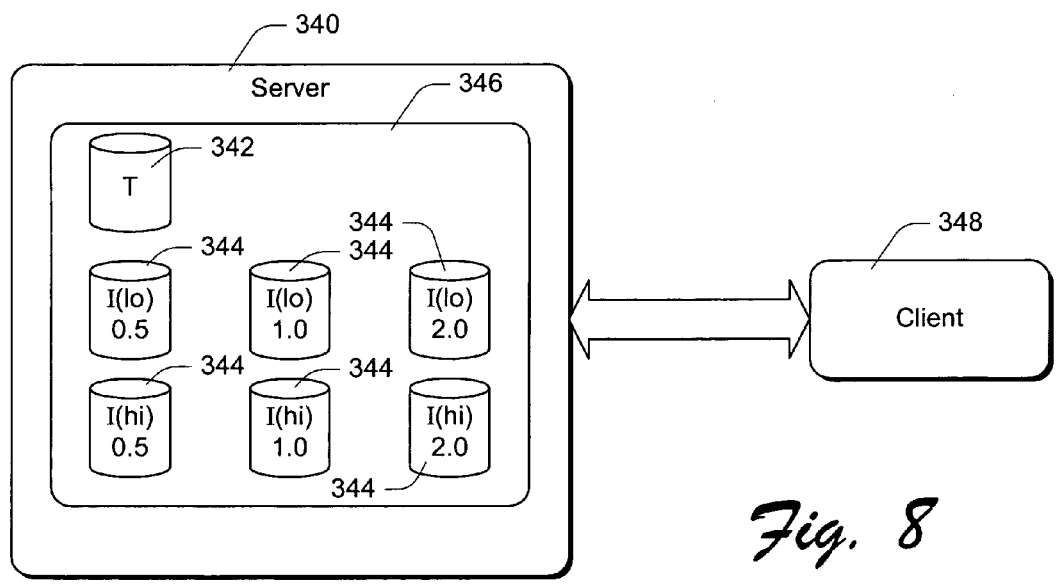
FIG. 8 is a block diagram illustrating yet another embodiment in which a plurality of timeline-altered media streams are stored at and provided from a server.

FIG. 8 illustrates yet another embodiment in which multiple media streams are stored at the server for use depending upon available bandwidth and upon the speed factor designated by the user. In this embodiment, a server 340 stores a single text stream 342 and multiple image streams 344, all corresponding to and representing the same multimedia content 346. The text stream has an unaltered timeline. However, the image streams have different timelines and also vary by quality and corresponding bandwidth requirements. Specifically, in this example the image streams have timelines modified by factors of 0.5, 1.0, and 2.0. For each speed factor, there is a "low" bandwidth image stream having a relatively low quality, and a "high" bandwidth image stream having a relatively high quality.

At a normal, unaltered playback rate, assume the text stream utilizes a bandwidth of 16 Kbps (kilobits per second), the low bandwidth image streams require a bandwidth of 20 Kbps, and while the high bandwidth image streams require a bandwidth of 40 Kbps. Now, suppose that a client requests the multimedia content over a communications channel having a bandwidth of 56 Kbps, at a speed factor of 2.0. At this speed factor, the client consumes text data at twice the normal rate, which in this case is 32 Kbps. That leaves 24

Kbps of available bandwidth. Accordingly, the server selects the low bandwidth image stream with the timeline modified by a factor of 2.0, and combines it with the text stream to form a composite media stream for streaming to the client. The total required communications bandwidth is 52 Kbps, which is within the limits of the available bandwidth.

Although the example given with reference to FIG. 8 is relatively specific, this method of bandwidth utilization can be generalized to include other types of media streams with each stream being assigned a priority.

Furthermore, a stream can sometimes be timeline-modified dynamically at the server without incurring significant overhead. Accordingly, the server can adjust the timeline and quality of the stream dynamically to match the available bandwidth, eliminating the need to store multiple streams of the same content at the server. As an example of a situation where this might be easily accomplished, an MPEG (Motion Picture Expert Group) video stream contains independent frames and several levels of dependent frames. One easy way to reduce bandwidth is to simply drop lower-level dependent frames from the video stream.

Additionally, although FIGS. 5–8 illustrate the streaming of all media streams for particular multimedia content from a single server, the streams can alternatively be streamed from multiple servers. Thus, rather than streaming a composite stream from a single server that includes all the data streams for a particular multimedia presentation, the individual streams can be received from different servers. Additionally, multiple composite streams can be received from different servers, such as a composite stream from one server including image and text data streams, and another composite stream from another server including audio and video data streams. Additional communication between servers or between the client and servers may be required when multiple servers are streaming the data for particular multimedia content. For example, the text stream and corresponding required bandwidth selected by one server (or the client) can be communicated to the other server(s) to allow the other server(s) to determine the amount of available bandwidth.

Stream Synchronization

Media content can be provided to the client 104 of FIG. 3 from one or more servers 102 as discussed above. Different time-scale modification techniques can be used for each of the different streams. For example, video(1) time modification component 244 of FIG. 3 may use a non-linear compression algorithm, while video(2) time modification component 246 may use a linear compression algorithm. Additionally, time-scale modification for some streams may be carried out at client 104 and time-scale modification for other streams may be carried out at the server.

Master control 230 of FIG. 3 coordinates the time-scale modification of all the streams in the multimedia content. Master control 230 receives user requests for changes in the playback speed of the multimedia content. Such changes are communicated to the individual stream controls 218–228 or to the server(s) that are providing the time-scale modification (whether it be dynamically modified or pre-stored streams) for the individual stream(s). Alternatively, the coordination provided by master control 230 can be distributed partly or wholly throughout controls 218–228, thereby embedding the coordination of presenting a stream wholly or partly in the control of that stream.

When master control 230 receives a user request for a new playback speed for the multimedia content, master control 230 sends a message to each of the individual stream controls 218–228 of the new playback speed. This message is used by the corresponding time modification components 244–254 (whether they be located in the client 104 or server 102) to change the time-scale modification being performed to the new playback speed.

In an alternate embodiment, master control 230 does not send such messages to the individual stream controls 218–228. Rather, master control 230 maintains a presentation clock referred to as the "master clock". Each of the individual stream controls 218–228 maintains its own clock, referred to as a "slave clock", that the respective controls 218–228 synchronize with the master clock. The controls 218–228 monitor the master clock and keep their slave clocks in pace with the master clock, speeding up or slowing down their respective slave clocks as the master clock speeds up or slows down.

By maintaining a master clock and slave clock relationship, each of the controls 218–228 is alleviated of the burden of providing "elegant" time-scale modification. That is, some of the controls 218–228 may not have the ability to speed up or slow down the rate at which the media stream is rendered, remove less important portions of the media stream, etc. Rather, these controls may merely be able to detect when they are out of synchronization with the master clock and either jump ahead in their rendering or temporarily pause their rendering until they are re-synchronized.

Master control 230 may also perform additional monitoring of the multimedia content and alter the time-scale modification being performed based on available bandwidth between the server and client and/or based on the processing capabilities of the client.

Figure 9:
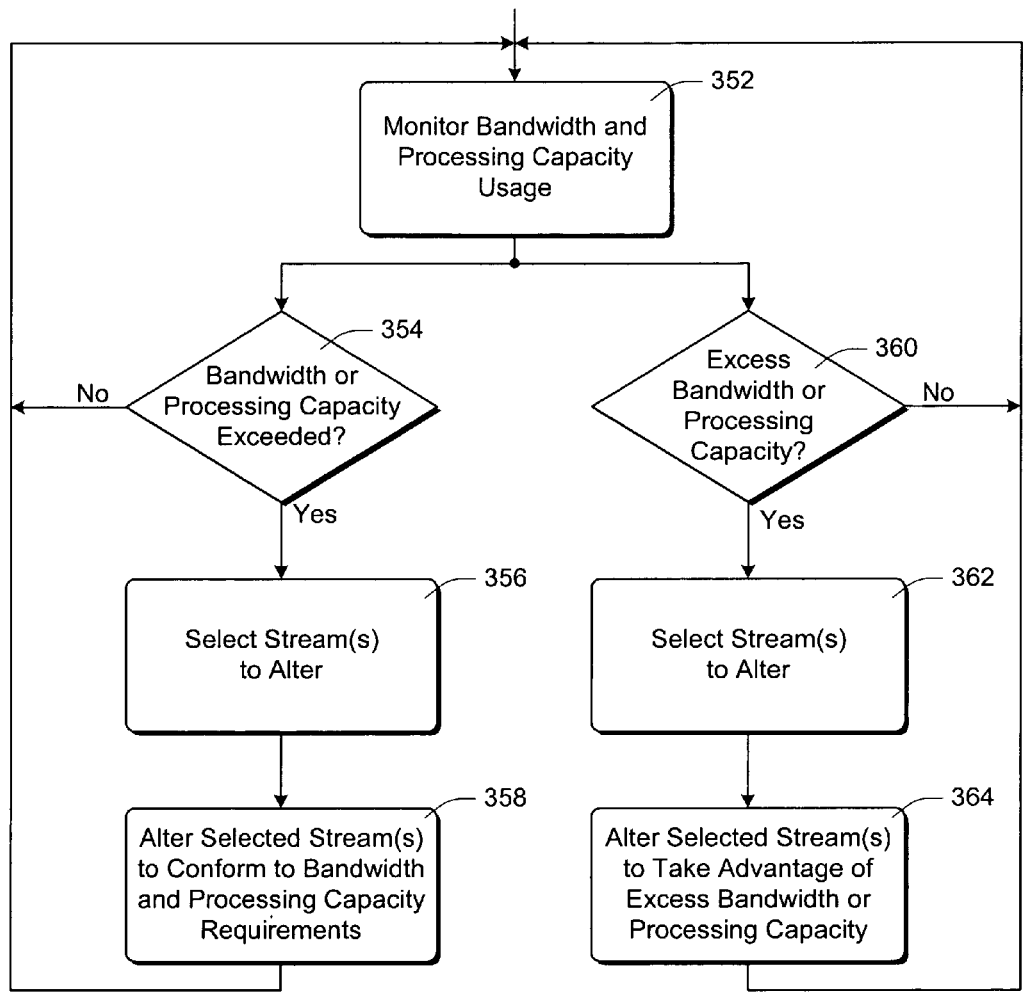
FIG. 9 is a flowchart illustrating an exemplary process for altering the streaming and time-scale modification of the multimedia content.

FIG. 9 illustrates an exemplary process used by master control 230 to alter the streaming and time-scale modification for the multimedia content. The process of FIG. 9 may be performed in software. FIG. 9 is described with additional reference to components in FIG. 3.

Master control 230 monitors the usage of both the bandwidth between server 102 and client 104 and the processing capabilities of client 104 (step 352). Master control 230 can be either pre-programmed or dynamically programmed with the server to client bandwidth devoted to streaming the multimedia content and the processing capabilities of client 104 devoted to playing back the multimedia content. Master control 230 compares these programmed values to the current bandwidth and processing usage to determine whether to make an alteration in a stream(s). The monitoring of step 352 can be performed continually, or alternatively in response to certain events (such as a new playback speed being requested by the user).

The monitored and programmed values are used to determine whether the bandwidth allotted to streaming the data or the processing capacity has been exceeded (step 354). Such changes can result, for example, due to a user request for a faster playback speed, or a reduction in the amount of bandwidth or processing capacity that can be devoted to streaming or playing back of the multimedia content.

If the allotted bandwidth or processing capacity has been exceeded, then master control 230 selects a stream(s) to be altered (step 356). The selection of stream(s) can be accomplished in a variety of manners. An ordered list can be provided to the master control (e.g., generated by the author of master control 230, by the author of the multimedia content or the user of client 104) that identifies the order in which streams are to be selected. Alternatively, each stream may be given a priority ranking and this priority ranking used by master control 230 to determine which stream to select for alteration (e.g., the lowest priority stream).

Master control also alters the selected stream(s) to conform to the current bandwidth and processing capacity requirements (step 358). In the illustrated example this alteration includes one or more of transferring time-scale modification for a selected stream(s) from client 104 to server 102, reducing the quality of the selected stream(s), or pausing a selected stream(s). Which of these actions is to be performed by master control can be determined by a set of rules programmed into master control 230. These rules can be generated by, for example, the author of master control 230, the author of the multimedia content, or the user of client 104. For example, the rules may indicate that all streams should continue to be played back regardless of the quality reduction of the selected streams, the rules may indicate that time-modification of only certain streams can be transferred to the client, the rules may indicate that audio or text streams should be paused rather than reducing the quality of any of the other streams, etc. Master control 230 sends messages to the appropriate individual stream controls as well as the appropriate servers to change the quality of a stream, pause a stream, or transfer time-scale modification processing from the local stream control to the server.

Returning to step 352, master control 230 also checks whether there is excess bandwidth or processing capacity that it can use (step 360). Such excess bandwidth or processing capacity can arise, for example, due to a reduction in the playback speed of the multimedia content or extra capacity or bandwidth being devoted to streaming or playback of the multimedia content. If such excess bandwidth or processing capacity is detected, master control 230 selects a stream(s) to alter (step 362). This selection process is analogous to that of step 356, except that the ordering of streams may be "reversed". For example, higher priority streams may be selected for improved quality due to the excess bandwidth or processing capacity. Alternatively, master control 230 may select the same streams that were previously selected for alteration in step 356.

Master control 230 also alters the selected stream(s) to take advantage of the excess bandwidth or processing capacity. This alteration is analogous to that of step 358, or alternatively may be to "undo" whatever alteration was previously performed for the stream in step 358. In making the selection and alteration in steps 362 and 364, master control 230 compares the bandwidth and processing capacities of the proposed alteration to the excess bandwidth or processing capacity to verify that neither the bandwidth nor the processing capacity devoted to the multimedia content is exceeded. For example, excess processing capacity at client 104 may be available, but the first alteration that master control 230 would want to make may exceed the bandwidth constraints and therefore cannot be carried out. Thus, master control 230 tests another alteration. If no alteration can be made that violates neither the bandwidth nor the processing capacities, then no alteration is made.

The operation of master control 230 in altering the streaming and the time-scale modification of the multimedia content is further illustrated in the following example. Assume that the bandwidth devoted to multimedia content is 150 Kbps and that the multimedia content includes two video streams, an image stream, an audio stream, and a text stream. Further assume that the time-scale modification of each of the video streams is performed at the client, that the time-scale modification of the image, audio, and text streams is performed at the server, and that at a speedup factor of 1.0, the video streams each require 30 Kbps, the image and audio streams each require 20 Kbps, and the text stream requires 10 Kbps. At the speedup factor of 1.0, the streams require only 110 Kbps of the available 150 Kbps of bandwidth. If the playback speed is increased to a speedup factor of 1.5, the video streams would require 45 Kbps of bandwidth to be time-compressed at the client, while the image and audio streams would still require 20 Kbps and the text stream 10 Kbps as these streams are being time-compressed at the server. At the speedup factor of 1.5, the streams require only 140 Kbps of the available 150 Kbps of bandwidth. However, if the speedup factor were to be increased to 2.0, then the video streams would require 60 Kbps while the image, audio, and text streams would require 20 Kbps, 20 Kbps, and 10 Kbps, respectively. The streams would require a total of 170 Kbps, which is not available. Thus, the master control would select and alter at least one of the streams, such as selecting one of the video streams for time-scale modification at the server (which would reduce the bandwidth requirements to 140 Kbps), or pause the text stream so it is no longer being streamed (which would reduce the bandwidth requirements to 150 Kbps).

Timeline Correlation

When the playback speed of the multimedia content is altered by the user, the playback of the multimedia content should continue in a relatively uninterrupted manner, albeit at the new playback speed. For example, suppose a user changes the playback speed from a speedup factor of 1.0 to a speedup factor of 1.5. The playback of the multimedia content should continue at approximately the location where the playback speed change was requested by the user rather than beginning playback at the beginning of the multimedia content at the new playback speed.

If timeline modification is performed at the client or is performed dynamically at the server, then the client or server can begin timeline modification when the user request is received. As the timeline modification is being performed "on the fly" on the same underlying data stream, difficulties in maintaining timeline correlation typically do not arise.

However, in situations where multiple versions of a media stream are stored at a server (e.g., as discussed above with reference to FIGS. 5–8), timeline correlation problems can arise. In order for the server to switch from one data stream to another (corresponding to the new playback speed), the correct location in the new stream to begin streaming needs to be determined.

In order to make such determinations, one of the versions of a particular data stream (e.g., one of the video streams 304 of FIG. 5) is referred to as a primary or reference version of the media stream. A primary media stream normally has a timeline that has not been altered. The remaining versions of the data stream stored by the server are media streams having timelines that have been altered in accordance with linear and/or non-linear techniques.

There is a known timeline correlation between the data units of the various media streams. The term "timeline correlation" as used herein refers to a correlation in content between two streams that differ in the degree and/or manner in which their timelines have been modified. Thus, a playback point one minute into an unaltered timeline correlates to a point thirty seconds into a timeline that has been linearly altered by a factor of 2.0 (accelerated to twice the speed of the original). More generally, the point in the new timeline equals oldtime(oldfactor/newfactor), where oldtime is the presentation time in the first media stream at which the speed change is to occur, oldfactor is the playback speed or factor of the old media stream, and newfactor is the playback speed or factor of the new media stream.

When non-linear timeline alteration is involved, the correlation between streams cannot be calculated in this manner. In the illustrated example, the timeline correlations are compiled and stored as the non-linear compression is performed (step 364). The stored data is then referenced by the system when it becomes necessary to find content in one stream corresponding to the same content in another stream.

Specifically, the server stores one or more sets of timeline correlations between the timelines of the primary and timeline-altered media streams. These sets of correlations are arranged to allow each cross-referencing between the various streams. For example, one set of correlations contains mappings from presentation times of the primary media stream to timeline-correlated presentation times of the timeline-altered media streams. Other sets of correlations correspond to individual ones of the time-altered media streams. Each of these sets contains mappings from presentation times of the corresponding timeline-altered media stream to correlated presentation times of the primary media stream.

Figure 10:
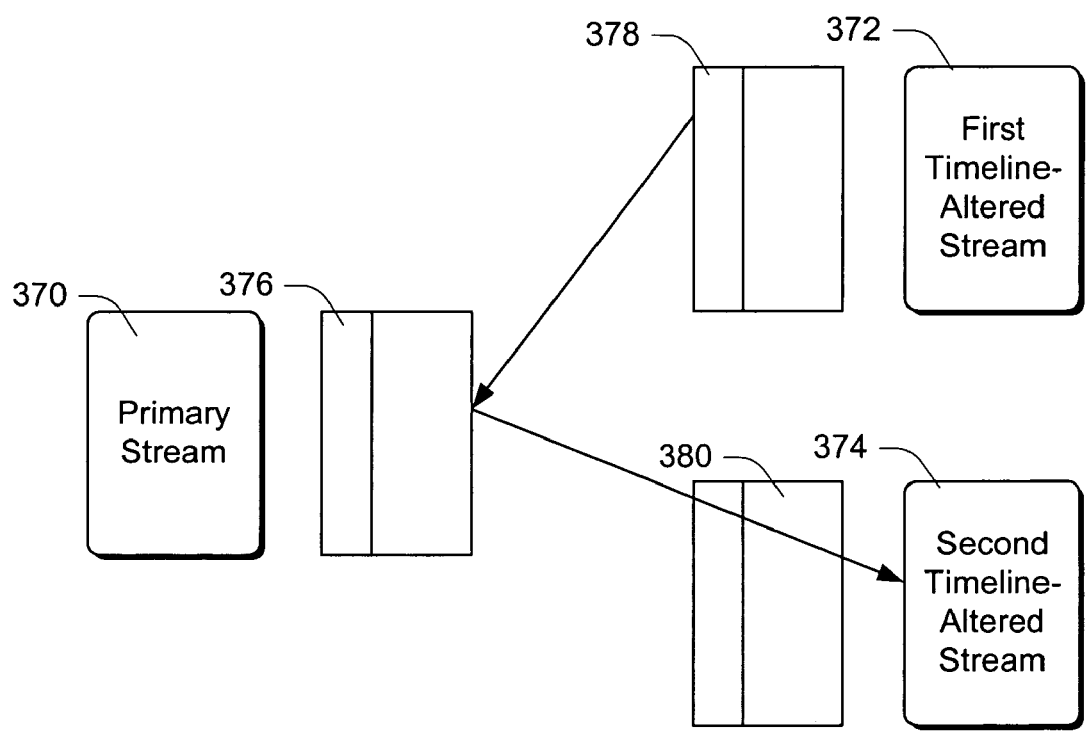
FIG. 10 is a block diagram illustrating exemplary sets of timeline correlations between the timelines of media streams.

FIG. 10 illustrates this more clearly. Shown in FIG. 10 are a primary media stream 370, a first timeline-altered media stream 372, and a second timeline-altered media stream 374. In this example, the timeline-altered media streams have corresponding timelines that are non-linearly altered relative to the timeline of the primary media stream.

Also shown in FIG. 10 are reference tables or data objects corresponding to the media streams. Table 376, associated with primary media stream 370, is a cross-reference containing mappings from presentation times of the primary media stream to timeline-correlated presentation times of the first and second media streams. Table 376 is indexed by presentation times of the primary media stream. Thus, for any given presentation time of the primary media stream, it is possible to quickly find a corresponding or timeline-correlated presentation time in either of the two timeline-altered media streams.

By itself, table 376 is useful when switching from primary media stream 370 to one of the timeline-altered media streams 372 and 374. To transition, for instance, from the primary media stream to the first timeline-altered media stream, the current presentation time of the primary media stream is noted. This presentation time is used as an index into table 376 to find the correlated presentation time in the first media stream. The first media stream is then initiated at the correlated time as found in the table.

Further tables or data objects 378 and 380 are associated respectively with first and second timeline-altered media streams 372 and 374, and are used as back-references to the primary media stream. Each of these tables is indexed by the presentation times of its associated media stream, to find timeline-correlated presentation times in the primary media stream.

The tables or data objects can be stored and referenced by server 102. Alternatively, they can be stored by server 102 and downloaded to client 104 as needed. As a further alternative, the data objects with the timeline-altered media streams can be provided with individual data units of the timeline-altered media streams. In accordance with this further alternative, each data unit is accompanied by a presentation time at which the data unit is to be rendered, and also by a reference presentation time, where the reference presentation time indicates a presentation time in the primary reference stream that corresponds to the presentation time of the data unit in the timeline-altered media stream. This reference presentation time is then used to index table 376 associated with primary stream 370.

Figure 11:
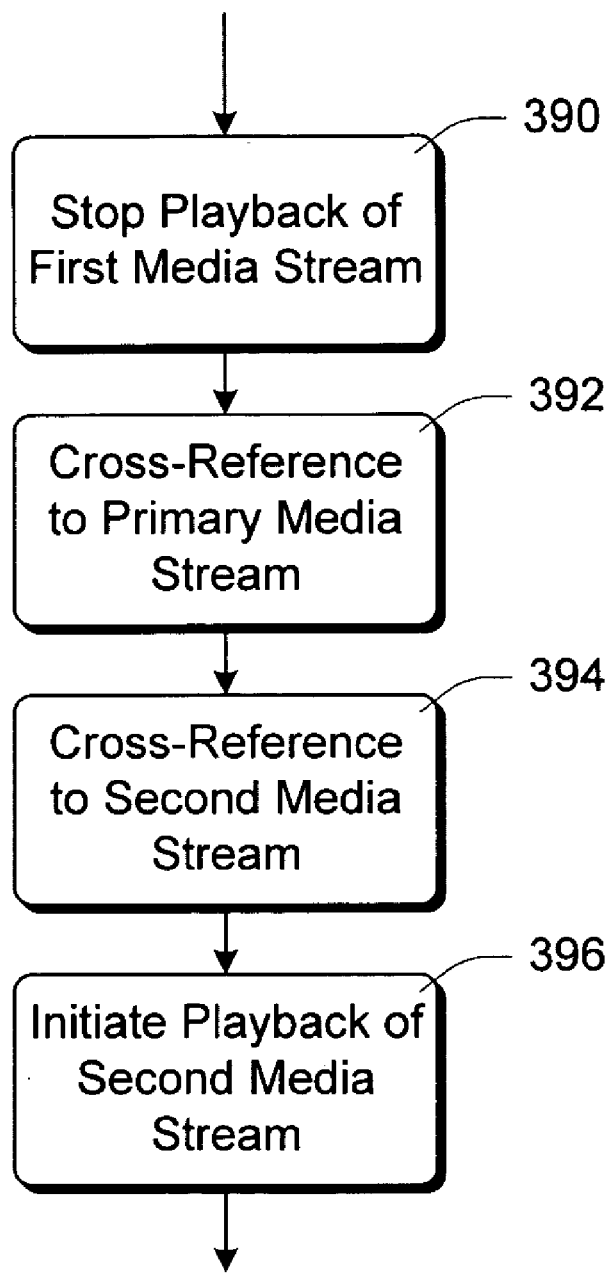
FIG. 11 is a flowchart illustrating an exemplary process for finding an appropriate presentation time in a new stream when switching from a previous stream to the new stream.

FIG. 11 illustrates the process used to find an appropriate presentation time in the second timeline-altered media stream, when switching from the first timeline-altered media stream to the second timeline-altered media stream. The process of FIG. 11 may be performed in software. FIG. 11 is described with additional reference to components in FIG. 10.

Playback of the first media stream is initially stopped at a particular presentation time of the first media stream (step 390). A stored table or cross-reference 378 is referenced to determine a presentation time of the primary media stream that has a timeline correlation with the particular presentation time at which playback of the first media stream was stopped (step 392). A table 376 of primary media stream 370 is then referred to in order to determine a presentation time of the second media stream that has a timeline correlation with the determined presentation time of the primary media stream (step 394). Playback of the second media stream is then initiated at a point in the second media stream having a presentation time that is no greater than the determined presentation time (step 396). In the described embodiment of the invention, playback is initiated somewhat prior to the determined presentation time, thus providing a short overlap in the rendered content to provide context when initiating the second timeline-altered media stream in midstream.

The referencing steps are illustrated in FIG. 10. An arrow from the reference table 378 of first media stream 372 indicates that the table 378 is used to find a time-correlated presentation time in the primary media stream. This value is used to index table 376 of primary stream 370 to find a timeline-correlated presentation time in second media stream 374.

User Experience

The functionality described above is exposed through an application program executed at network client 104, referred to herein as a streaming multimedia player. The streaming multimedia player may be incorporated into the operating system or run as a separate, self-contained application. In either case, the streaming multimedia player operates in a graphical user interface windowing environment such as provided by the "Windows" brand of operating systems, available from Microsoft Corporation of Redmond, Wash.

Figure 12:
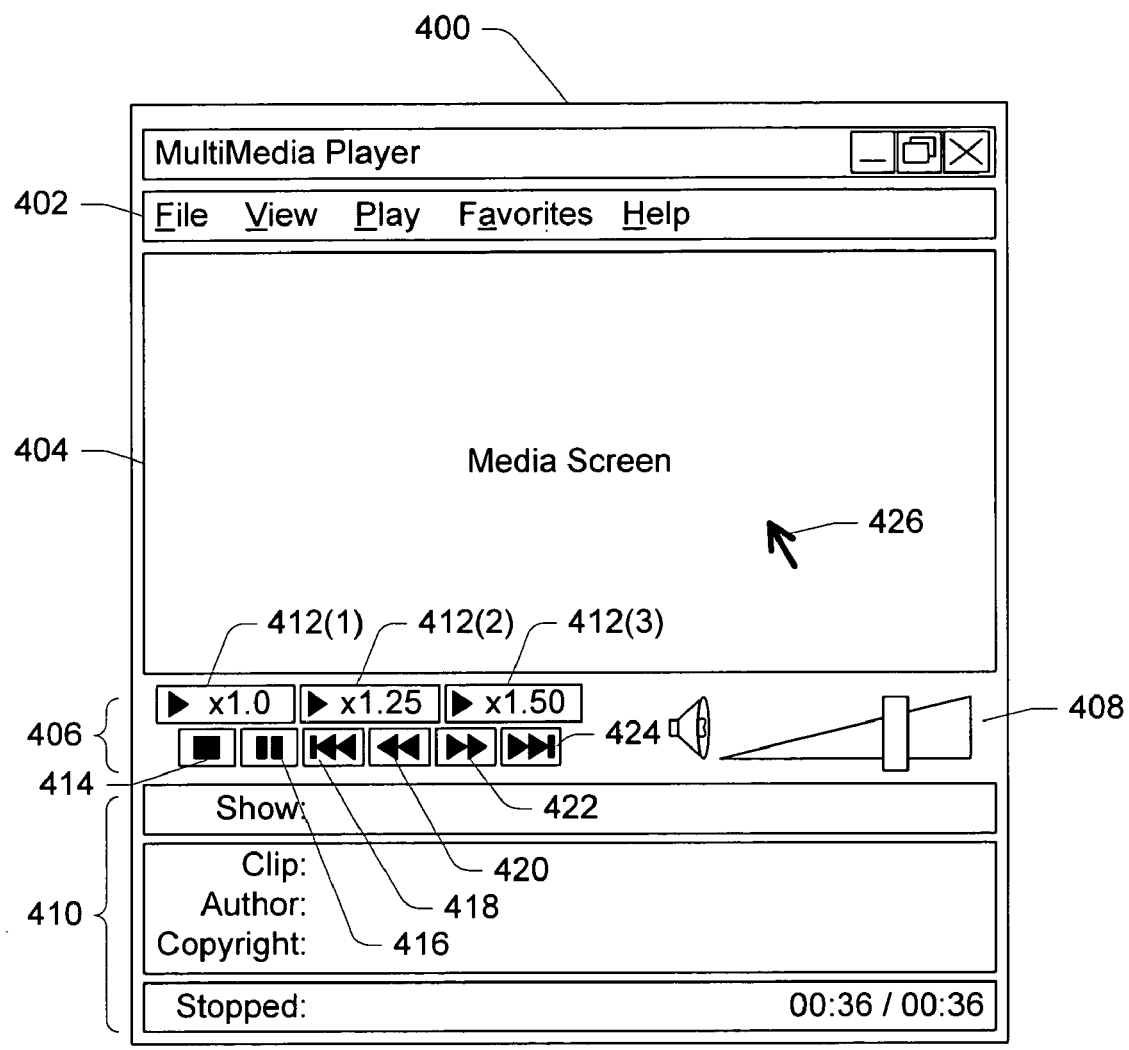
FIG. 12 is a diagrammatic illustration of a graphical user interface window having a time-scale-modification tool for changing a playback speed of streaming multimedia content according to one implementation.

FIG. 12 shows one implementation of a graphical user interface window 400 for the multimedia player. This UI window 400 has a command bar 402, a media screen 404, shuttle controls 406, a volume control 408, and content information space 410. Command bar 402 lists familiar UI commands, such as "File", "View", and so forth.

Media screen 404 is the region of the UI within which the visual media stream(s) is rendered. For video, image, animation, and text streams, the underlying video, images, animations, and text are displayed on screen 404. Each of these streams can be displayed in a different portion of the screen 404 (alternatively, one or more of the portions may be overlapped by another portion).

Shuttle controls 406 enable the user to control play of the multimedia content. Shuttle controls 406 include multiple play buttons 412(1), 412(2), and 412(3), a stop button 414, a pause button 416, rewind buttons 418 and 420, and fast forward buttons 422 and 424.

Play buttons 412(1)–412(3) are associated with different playback speeds of the multimedia content. In this illustration, play button 412(1) corresponds to a normal playback speed (i.e., "×1.0"), play button 412(2) corresponds to a faster playback speed with a speed up factor of 25% (i.e., "×1.25"), and play button 412(3) corresponds to an even faster playback speed with a speed up factor of 50% (i.e., "×1.50"). It is noted, however, that more or less than three buttons may be used (e.g., two, four, five, etc.) and may correspond to speeds both above and below the normalized speed of "×1.0".

The user can actuate one of the play buttons via a UI actuation mechanism, such as a pointer 426 or by tabbing to the desired play button and hitting the "enter" key. Upon selection of a play button, the multimedia player plays the multimedia content at the playback speed associated with the selected play button. For instance, if the user selects play button 412(2) with a 25% speedup factor, the multimedia player plays the content at a playback speed of 1.25 times the original or default playback speed.

Once the multimedia content is playing at one speed, the user is free to select a new speed by actuating another of the play buttons 412(1)–412(3). Suppose the user decides to slow the content back to normal speed. The user can actuate the "×1.0" play button 412(1) to return the media content to the normal speed. In response to speed changes, the multimedia player is configured to repeat a portion of the multimedia content at the new speed.

Content information space 410 lists information pertaining to the multimedia content being rendered on the media screen 404. The content information space includes the show name, author and copyright information, and tracking/timing data.

Figure 13:
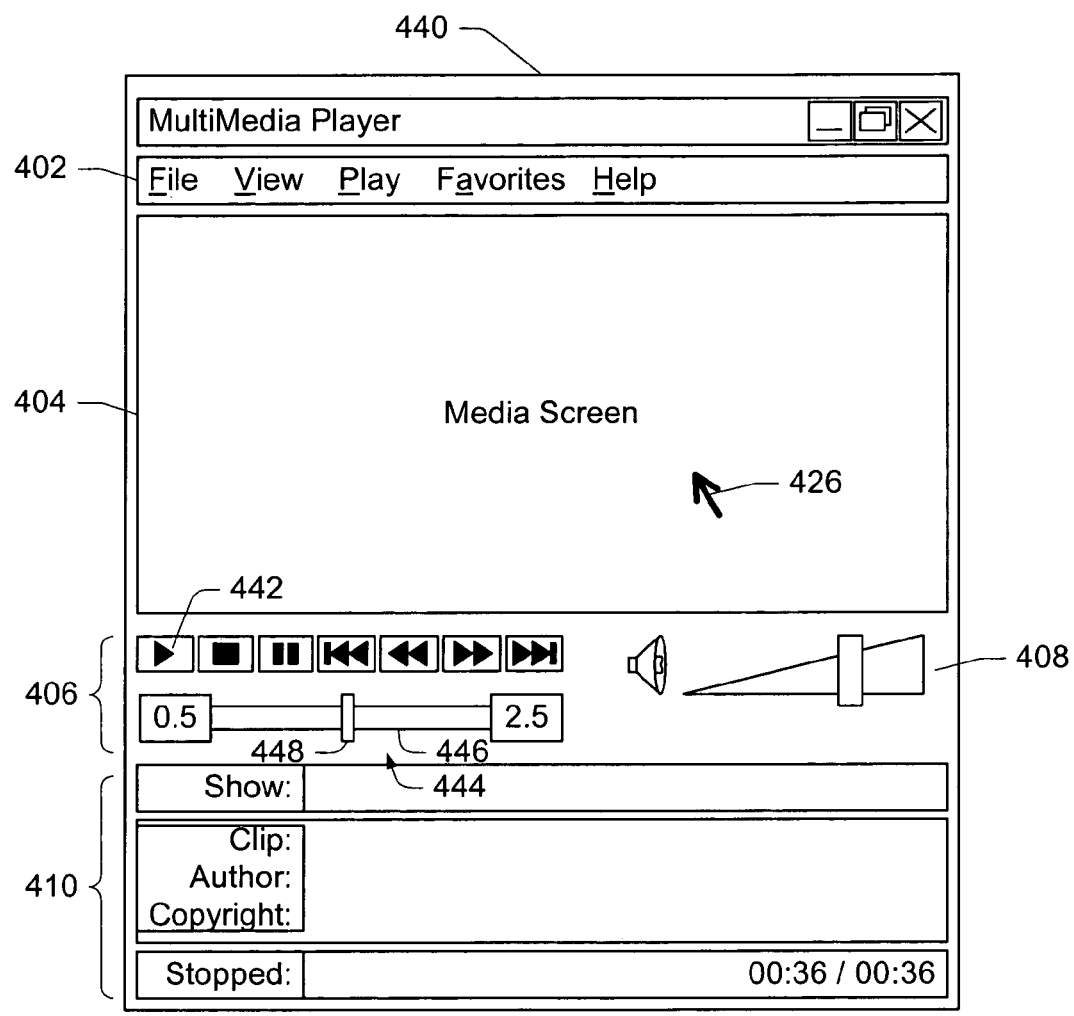
FIG. 13 is a diagrammatic illustration of a graphical user interface window having a time-scale-modification tool according to a second implementation.

FIG. 13 shows another implementation of a graphical user interface window 440 for the multimedia player. Like UI 400 of FIG. 11, UI 440 has command bar 402, media screen 404, shuttle controls 406, volume control 408, and content information space 410. This implementation, however, employs only a single play button 442. Actuation of play button 442 initiates play of the multimedia content.

UI 440 has a scale mechanism 444 to vary the speed of the content during rendering. The scale mechanism has a range of playback speeds 446, which in this example range from 0.5× to 2.5× the normal speed. Scale mechanism 444 also has a movable slider 448 that is movable over the range 446. The user can position the slider 448 at the desired speed at which the multimedia player is to play the multimedia content.

In the FIG. 13 illustration, range 446 is a continuous range from a high playback speed (i.e., 2.5×) to a low playback speed (i.e., 0.5×). Slider 448 moves continuously over the range. In other implementations, range 446 is a discrete range of discrete playback speeds (e.g., 0.5×, 1.0×, 1.5×, 2.0×, and 2.5×) and the slider is movable among the discrete playback speeds.

Once the multimedia content is playing at one speed, the user is free to select a new speed by moving the slider 448 to a new speed. In response to use manipulation of the scale mechanism, the multimedia player repeats a portion of the multimedia content and begins playing at the new speed.

Figure 14:
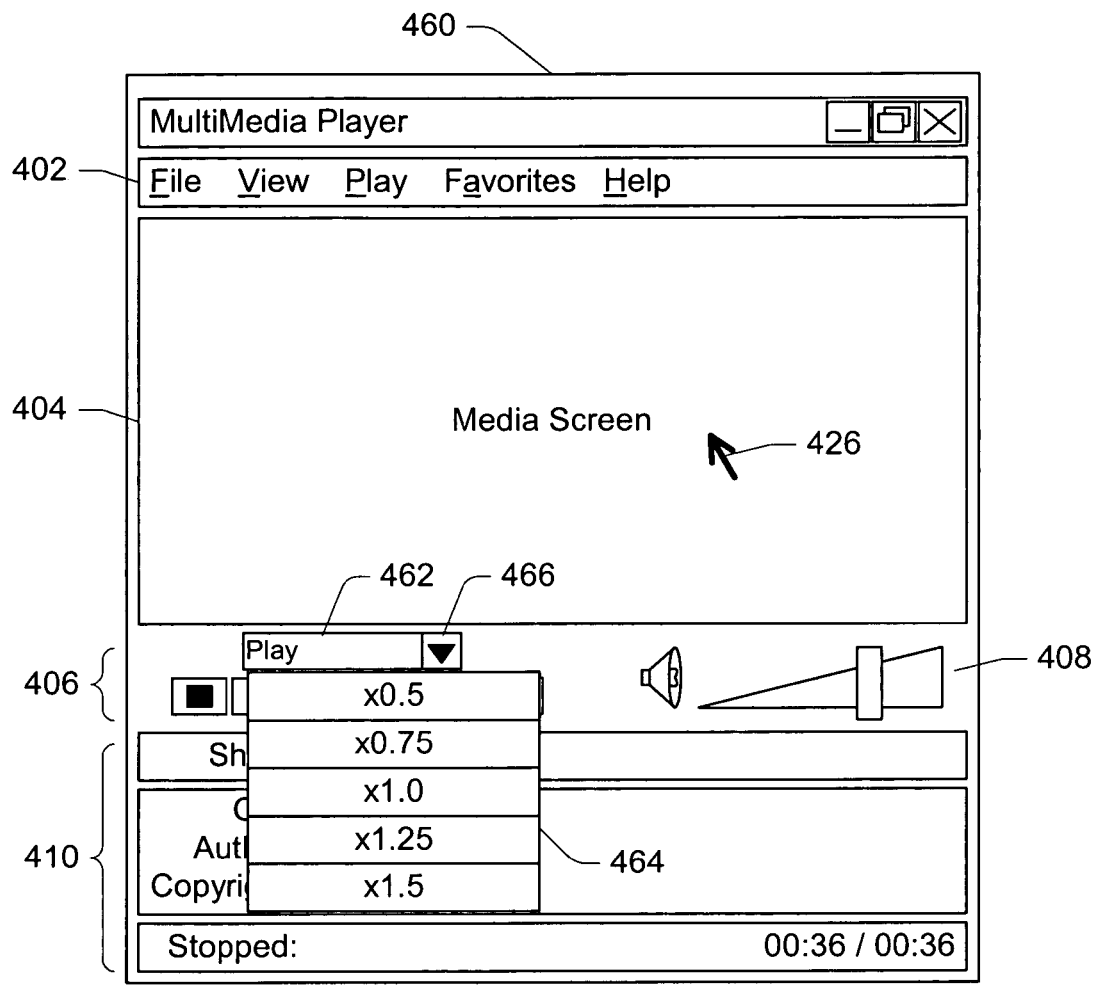
FIG. 14 is a diagrammatic illustration of a graphical user interface window having a time-scale-modification tool according to a third implementation.

FIG. 14 shows a third implementation of a graphical user interface window 460 for the multimedia player. In this implementation, UI 460 has a single play button 462 to initiate playback of the multimedia content. UI 460 also has a menu 464 associated with the play button. In this illustration, menu 464 is a drop-down or pull-down menu that opens beneath the play button in response to actuation of a tab 466 adjacent to the play button. Alternatively, menu 464 may be invoked by placing pointer 426 over play button 462 and right clicking a mouse button.

Menu 464 lists multiple playback speeds from which a user can select. In the illustrated example, five playback speeds are listed: ×0.5, ×0.75, ×1.0, ×1.25, and ×1.5. The user can select one of the listed speeds to instruct the multimedia player to play the multimedia content at a desired speed. As noted above, the user can select a new speed after the content has begun playing by invoking the menu and selecting the new speed. In response, the multimedia player repeats a portion of the multimedia content and begins playing at the new speed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An apparatus comprising:
    a master control component to maintain a master timeline for a multimedia presentation having a plurality of individual data streams; and
    for each of the plurality of individual data streams, an individual stream control corresponding to the individual data streams of the multimedia presentation, wherein each individual stream control is to maintain a timeline for the corresponding individual data stream and wherein an individual stream control determines when the master timeline is modified by the master control so that the individual stream controls can modify the corresponding individual data streams to accommodate the modified master timeline;
    wherein the master control component is also to receive a user request for a new playback speed and communicate the new playback speed to the plurality of individual stream controls, and the master control component is to communicate the new playback speed to the plurality of individual stream controls by sending a message to each of the plurality of individual stream controls.

2. An apparatus as recited in claim 1, wherein each of the plurality of individual stream controls is to monitor the master timeline and adjust the timeline maintained by each such stream control to maintain synchronization with the master timeline.

3. An apparatus as recited in claim 1, wherein the individual data streams include one or more of an image stream, a text stream, and an animation stream.

4. A method in a network client for synchronizing streams of a multimedia presentation having a plurality of streams, the streams located at one or more network servers, the method comprising:
    maintaining a presentation timeline using a master control;
    receiving from the one or more network servers the plurality of streams, each stream of the plurality of streams having a slave control;
    detecting an event that causes a change in the presentation timeline;
    modifying the master control's presentation timeline in response to the event; and
    notifying each slave control of the plurality of streams that the presentation timeline has been modified, so that the slave controls can alter their corresponding streams to accommodate the modified presentation timeline;
    wherein the master control is also to receive a user request for a new playback speed and communicate the new playback speed to the plurality of individual slave controls, and the master control is to communicate the new playback speed to the plurality of individual slave controls by sending a message to each of the plurality of individual slave controls.

5. The method recited in claim 4, wherein the event is a decrease in the available bandwidth from one or more of the servers to the client.

6. The method recited in claim 4, wherein the event is an increase in the available bandwidth from one or more of the servers to the client.

7. The method recited in claim 4, wherein the event is a change in the speed of playback selected by a user viewing the presentation.

8. The method recited in claim 4 wherein the modifying of the master control's presentation timeline further comprises selecting particular streams for alteration.

9. The method recited in claim 8 wherein the selecting of particular streams is performed using a priority ranking provided to the master control.

10. The method recited in claim 8 wherein the selecting of particular streams is performed using a user-supplied ordered list provided to the master control.

11. The method recited in claim 4 wherein the altering of a stream by a slave control is selected from the group consisting of jumping ahead in the stream, pausing the stream, and time-scale modification of the stream.

12. The method recited in claim 4 wherein the event is generated by the user choosing the manner of change to the presentation timeline.

13. The method recited in claim 4 wherein the individual streams include one or more of an image stream, a text stream, and an animation stream.

14. The method recited in claim 4 wherein the slave controls are located at the network servers.

15. The method recited in claim 4 wherein the slave controls are located at the network client.

16. The method recited in claim 4 wherein multiple slave controls are located at the same network server.

17. The method recited in claim 4 wherein the streams are received from different servers.

18. A computer-readable medium whose contents cause a computing system to perform a method in a network client for synchronizing a plurality of streams of a presentation, the method comprising:
   maintaining a presentation timeline for the presentation using a master control;
   receiving the plurality of streams from network servers, each of the plurality of streams having a slave control;
   detecting an event that causes a change in the presentation timeline of the presentation; and
   modifying the master control's presentation timeline in response to the event
wherein the master control notifies the slave controls for the plurality of streams that the presentation timeline has been modified so that the slave controls can alter their streams to accommodate the modified presentation timeline;
wherein the master control is also to receive a user request for a new playback speed and communicate the new playback speed to the plurality of individual slave controls, and the master control is to communicate the new playback speed to the plurality of individual slave controls by sending a message to each of the plurality of individual slave controls.

19. The computer-readable medium of claim 18, wherein the event is a decrease in the available bandwidth from one or more of the servers to the client.

20. The computer-readable medium of claim 18, wherein the event is an increase in the available bandwidth from one or more of the servers to the client.

21. The computer-readable medium of claim 18, wherein the event is a change in the speed of playback selected by a user viewing the presentation.

22. The computer-readable medium of claim 18 wherein the modifying of the master control's presentation timeline further comprises selecting particular streams for alteration.

23. The computer-readable medium of claim 22 wherein the selecting of particular streams is performed using a priority ranking provided to the master control.

24. The computer-readable medium of claim 22 wherein the selecting of particular streams is performed using a user-supplied ordered list provided to the master control.

25. The computer-readable medium of claim 18 wherein the altering of a stream by a slave control is selected from the group consisting of jumping ahead in the stream, pausing the stream, and time-scale modification of the stream.

26. The computer-readable medium of claim 18 wherein the event is generated when a user indicates how to change the presentation timeline.

27. The computer-readable medium of claim 18 wherein the individual streams include one or more of an image stream, a text stream, and an animation stream.

28. The computer-readable medium of claim 18 wherein the slave controls are located at network servers.

29. The computer-readable medium of claim 18 wherein the slave controls are located at the network client.

30. The computer-readable medium of claim 18 wherein multiple slave controls are located at the same network server.

31. The computer-readable medium of claim 18 wherein the streams are received from different servers.

32. A system for synchronizing streams of a presentation having a plurality of streams comprising:
   a master control component located at a network client for maintaining a presentation timeline;
   a first slave control component located at a first network server for controlling a stream being transmitted by the first network server; and
   a second slave control component located at a second network server for controlling a stream being transmitted by the second network server;
wherein the master control detects an event that causes a change in the presentation timeline, modifies the presentation timeline in response to the event, and notifies the slave control components that the presentation timeline has been modified so that the slave control components can alter their streams to accommodate the modified presentation timeline; and
wherein the master control component is also to receive a user request for a new playback speed and communicate the new playback speed to the plurality of individual slave control components, and the master control component is to communicate the new playback speed to the plurality of individual slave control components by sending a message to each of the plurality of individual slave control components.

33. The system of claim 32, wherein the event is a decrease in the available bandwidth from one or more of the servers to the client.

34. The system of claim 32, wherein the event is an increase in the available bandwidth from one or more of the servers to the client.

35. The system of claim 32, wherein the event is a change in the speed of playback selected by a user viewing the presentation.

36. The system of claim 32 wherein the modifying of the master control's presentation timeline further comprises selecting particular streams for alteration.

37. The system of claim 36 wherein the selecting of particular streams is performed using a priority ranking provided to the master control.

38. The system of claim 36 wherein the selecting of particular streams is performed using a user-supplied ordered list provided to the master control.

39. The system of claim 32 wherein the altering of the stream is selected from the group consisting of jumping ahead in the stream, pausing the stream, and time-scale modification of the stream.

* * * * *